United States Patent [19]

Laib

[11] Patent Number: 4,714,124

[45] Date of Patent: Dec. 22, 1987

[54] GUIDANCE SYSTEM FOR SELF-GUIDED VEHICLE

[75] Inventor: Donald L. Laib, Forest Grove, Oreg.

[73] Assignee: Forest Grove Industries, Inc., Forest Grove, Oreg.

[21] Appl. No.: 872,034

[22] Filed: Jun. 9, 1986

[51] Int. Cl.[4] .......................................... B62D 1/24
[52] U.S. Cl. .................................. 180/168; 318/587; 340/905
[58] Field of Search ....................... 180/168, 167, 169; 318/587, 653; 340/904, 905, 941

[56] References Cited

U.S. PATENT DOCUMENTS

| | | | |
|---|---|---|---|
| 3,411,603 | 11/1968 | Kohls | 180/168 |
| 3,493,923 | 2/1970 | Stevens et al. | 340/905 |
| 3,609,678 | 9/1971 | Fayling | 340/905 |
| 3,653,456 | 4/1972 | Uemura | 180/168 |
| 3,669,206 | 6/1972 | Tax et al. | 180/168 |
| 3,768,586 | 10/1973 | Thompson | 180/168 |
| 4,247,896 | 1/1981 | Schnaibel | 180/168 |
| 4,307,329 | 12/1981 | Taylor | 318/587 |
| 4,401,181 | 8/1983 | Schwarz | 180/168 |
| 4,456,088 | 6/1984 | Nishiki et al. | 180/168 |

*Primary Examiner*—David M. Mitchell
*Attorney, Agent, or Firm*—Chernoff, Vilhauer, McClung & Stenzel

[57] ABSTRACT

A guidance system for a self-guided vehicle features an electrical conductor and permanent magnets embedded together in an elongate groove formed in a vehicle-supporting surface such as a factory or warehouse floor. The electrical conductor provides steering guidance while the permanent magnets embedded with the conductor provide other information without distorting the magnetic field of the electrical conductor. To prevent such distortion, the permanent magnets are selected for their low magnetic permeability and high electrical resistivity. Magnetic field sensors are provided on the vehicle for determining exact position of the vehicle along its path of travel by sensing deviation, or lack thereof, with respect to such permanent magnets.

35 Claims, 4 Drawing Figures

GUIDANCE SYSTEM FOR SELF-GUIDED VEHICLE

BACKGROUND OF THE INVENTION

This invention relates to a guidance system for a self-guided vehicle. More particularly, it relates to a system for providing position information to the vehicle and for controlling certain aspects of the vehicle's operation in response thereto, such as precision stopping at predetermined locations as the vehicle travels along a predetermined path.

Many self-guided vehicles used in industrial applications such as warehouses and the like are of the type capable of following a path defined by a current-carrying guide wire arranged on, or more typically embedded in a groove in, the surface over which the vehicle travels. Vehicles of this type, such as those disclosed in Kohls U.S. Pat. No. 3,411,603, Thompson et al. U.S. Pat. No. 3,768,586, Schnaibel U.S. Pat. No. 4,247,896, Nishiki et al. U.S. Pat. No. 4,456,088, Tax et al. U.S. Pat. No. 3,669,206 and Taylor U.S. Pat. No. 4,307,329, generally employ induction coils to sense the magnetic field caused by the AC current in the guide wire, and use steering control signals generated by the coils to detect and correct any deviation from the guide wire so as to guide the vehicle along the path defined by the guide wire.

In addition to the steering reference signal provided by the magnetic field of the guide wire, other control information, such as vehicle position along the path of travel and the location of destinations where the vehicle is to stop and pick up or deliver cargo, is needed. Some self-guided vehicle systems, such as that disclosed by Tax et al., employ sensing loops along the pathway for sensing the approximate position of the vehicle as it passes by the sensing loops. Other systems, such as that disclosed by Thompson et al., employ a sensor unit on the vehicle to sense approximate position data contained in nodes or loops formed by the guide wire(s). Still other systems, such as those disclosed by Kohls, and by Uemura U.S. Pat. No. 3,653,456, employ magnets, placed alongside the path and spaced transversely from the guide wire, to provide approximate position information to sensors mounted on the vehicle.

A major installation problem associated with systems employing a plurality of magnets spaced from the conductor, such as disclosed in Kohls, is that the magnets must be embedded in the surface over which the vehicle travels at locations spaced transversely from the guide wire, requiring a plurality of holes to be formed in such surface which interrupt the integrity of the surface and raise the installation cost of the system. Although it would be much less costly and less disruptive to the surface to embed the magnets in the same groove which contains the embedded guide wire, this has not been considered possible because the magnets would distort the magnetic field of the wire both by shunting the field away from the sensing coils on the vehicle and by creating interfering induced eddy current fields. Similarly, the guide wire node or loop systems described above would also result in a substantial installation expense and disruption of the supporting surface. An additional disadvantage to a system such as disclosed in Kohls is that an array of magnets arranged transversely to the direction of vehicle travel requires a corresponding array of sensors on the vehicle.

Because the foregoing systems provide only approximate position information in any case, most of the self-guided vehicles of the type described above must employ fifth wheel encoders to provide more precise vehicle position information by recording travel distances to enable the vehicle to be stopped at precise positions for loading and unloading cargo. For high accuracy, however, it is necessary continually to correct or update such encoders to compensate for slip, wheel wear, or floor irregularities which cause erroneous distance readings. Accordingly, another problem associated with such self-guided vehicles is that of providing highly accurate and reliable position signals which will enable the vehicle to decelerate and stop precisely at prescribed locations.

SUMMARY OF THE INVENTION

The present invention solves the installation problems of the aforementioned previous self-guided vehicle guidance systems by its recognition of the fact that embedding permanent magnets of low magnetic permeability, and preferably high electrical resistivity, within the operative portion of the magnetic field of the guide wire does not significantly disrupt or distort such field, either by shunting of the field or by creation of interfering eddy current fields, and therefore does not interfere with detection of the wire by the vehicle for steering purposes. Among the permanent magnet materials having a low magnetic permeability (i.e. substantially equal to one or that of free space) sufficient to minimize shunting of the field of the guide wire are ferrite, rare earth cobalt, and neodymium-iron-boron permanent magnets. The ferrite magnets also have the preferred high resistivity to minimize induced eddy currents. Other magnets can achieve the preferred high resistivity in a resin-bonded powdered state.

The benefit of placing such permanent magnets in close proximity to the guide wire, and particularly embedding them in the same groove as the wire, is principally that the integrity of the floor or surface over which the vehicle moves need not be disrupted by embedding signal generators such as wire nodes or magnets in the surface at locations apart from the groove. Also, the benefit of avoiding the expense of creating and maintaining numerous holes in, for example, the concrete floor of a warehouse to house permanent magnets will be readily appreciated.

The present invention employs magnetic field sensors, such as Hall effect sensors, mounted on the vehicle to sense the magnetic fields of the permanent magnets. A simple embodiment of the invention uses one or more magnetic field sensors, positioned on the vehicle directly above the guide wire groove, merely to detect the polarity or polarities of permanent magnets imbedded therein. Normally, an array of such magnets would be provided, spaced apart along the guide wire groove at a predetermined location, arranged with varied polar orientation of the individual magnets yielding a binary signal for each magnet, the combined binary signals providing a coded signal. The magnetic field sensor or sensors detect not only the polar orientation of each magnet, but also its relative position in the array. The information encoded in the array of magnets at a particular location might include approximate position information, speed information, or information regarding the path directly ahead of the vehicle such as turns, stops, or the like.

Precise positioning information (i.e., the exact position of the vehicle along the path of travel) is not obtainable from such a magnetic field sensor or sensors, even if arranged to sense the proximity-dependent strength of the field of a permanent magnet, because the proximity is variable not only with the position of the vehicle along the path of travel, but also with the position of the vehicle transverse to the path of travel. Also, the strength of the permanent magnet field is normally small enough to be distorted by the earth's magnetic field. However, a further embodiment of the present invention employs a magnetic field sensor assembly mounted on the vehicle in a manner to sense precisely the deviation, or lack thereof, along the path of travel of the sensor assembly relative to a permanent magnet, irrespective of the vehicle's transverse position or angle relative to the path of travel and irrespective of the earth's magnetic field. Although different sensor arrangements can be employed to accomplish this purpose, the preferable arrangement employs two sensors, each between a respective pair of elongate, mutually parallel flux concentrators extending in a direction other than the direction of polarity of the permanent magnet and preferably perpendicular thereto (e.g. along the path of travel for a transversely polarized magnet). The sensors are preferably arranged to cancel the effect of any homogeneous magnetic field, such as that of the earth, by producing signals of opposing but equal magnitude in response to such homogeneous field, and to produce simultaneous null signals or equal and opposite signals in response to the field of the permanent magnet when the sensor assembly is aligned with the magnet. Moreover, their output signals are opposite when on opposite sides (along the path of travel) of the permanent magnet, thereby indicating the direction in which correction of vehicle position is needed to obtain alignment with the magnet. The signals from the pair of magnetic field sensors may therefore be used to control a servo device associated with the vehicle's primary drive to cause the vehicle to stop in direct alignment with the magnet or, if the magnet is passed, to reverse and "hunt" for the exact position of the magnet until the correct position is obtained. Alternatively, the pair of sensors may be used to give precise position information to recalibrate a fifth wheel encoder when the sensors are directly aligned with the magnet.

The foregoing precise positioning signals can, if desired, be combined with signals from the same or other magnetic field sensors (such as those which sense magnet polarity) indicating general proximity to the permanent magnet by sensing field strength. In such case, the vehicle's approach to the magnet can be detected and a signal generated to decelerate the vehicle as it approaches the magnet, or prepare the vehicle's computer for the reception of information.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 1:
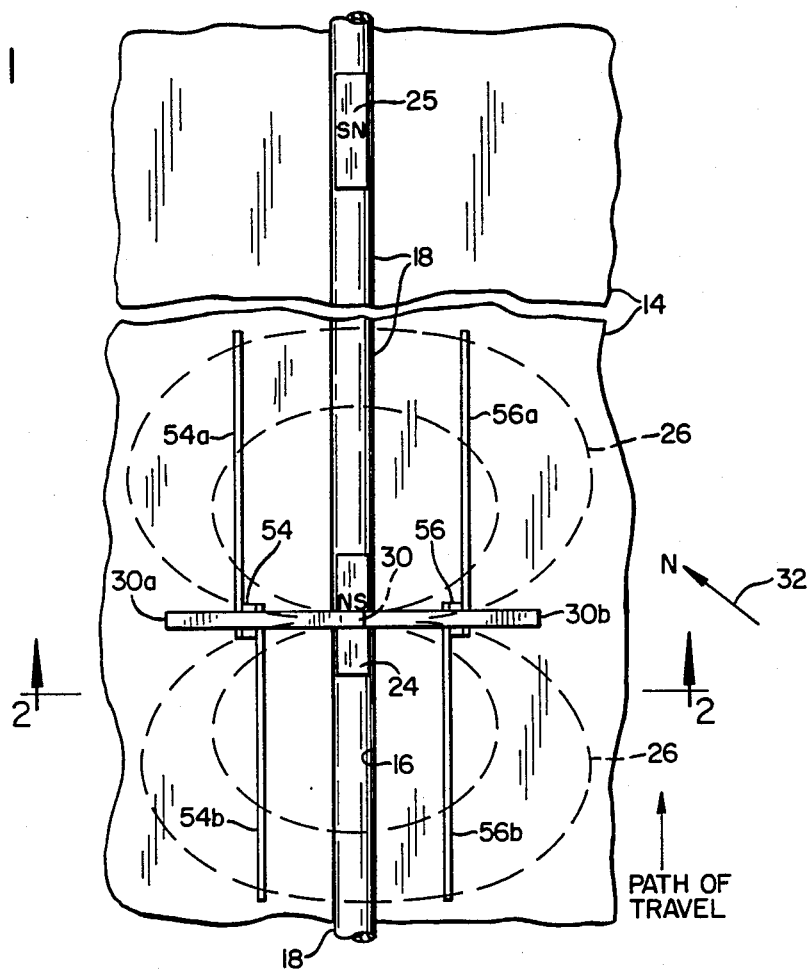
FIG. 1 is a plan view of an exemplary embodiment of the information-sensing portion of the guidance system of the present invention.
Figure 2:
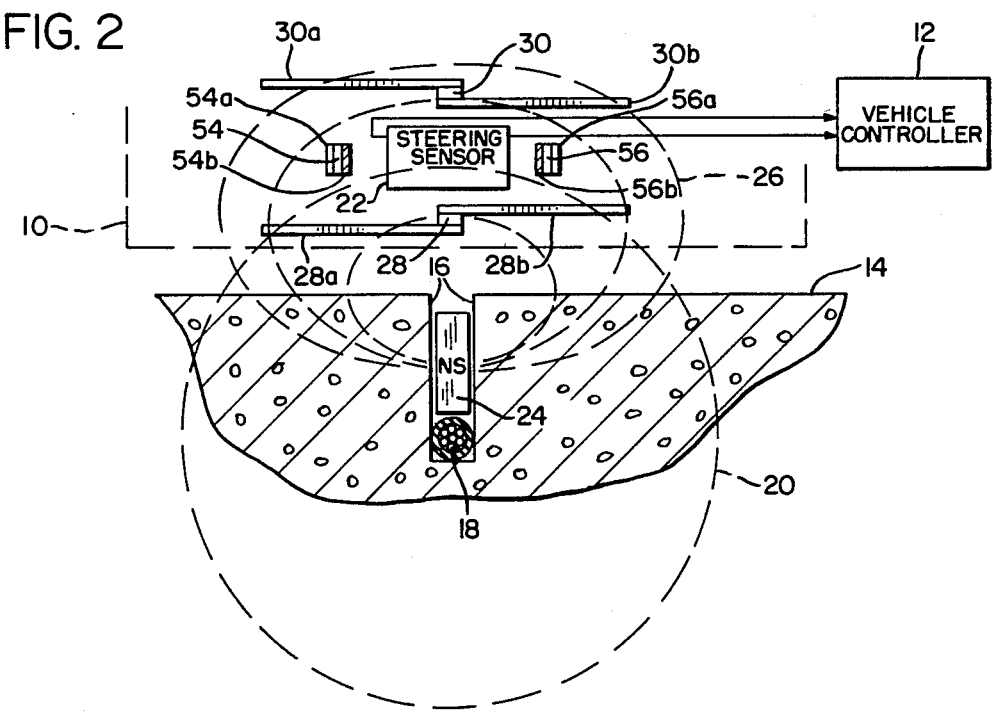
FIG. 2 is a cross-sectional view taken along line 2—2 of FIG. 1.

With reference to FIGS. 1 and 2, a self-guided vehicle 10 has a conventional microprocessor-based controller 12 controlling all of its operating systems, including its drive system (forward, reverse, decelerate, stop, etc.), its steering system and its cargo-handling implements, as well as any other special-purpose functional components with which it may be equipped, in a conventional manner. The vehicle 10 travels upon a supporting surface 14 which may be a warehouse or factory floor of concrete or similar magnetically-impermeable material. Formed in the floor 14 is an elongate groove 16 corresponding to the intended path of travel of the self-guided vehicle. An electrically-conductive, insulated cable 18 is embedded in the groove and carries alternating current so as to maintain a surrounding alternating magnetic field. The portion of the magnetic field referred to herein as the "operative portion" is the portion 20 which is sensed by a conventional steering sensor 22 on the vehicle 10. Such steering sensor 22 normally comprises a pair of coils (not shown) spaced transversely with respect to the path of travel of the vehicle. If the vehicle is centered on the conductor 18, signals of equal magnitude are induced by the operative portion of the field in the pair of coils indicating to the controller 12 that no steering correction is needed. However if the vehicle deviates to one side or the other of the conduit 18, signals of unequal magnitude are induced in the respective coils indicating the need for steering correction.

The unique guidance system of the present invention is employed in conjunction with the abovedescribed conventional steering control system. The guidance system includes a plurality of permanent magnets, such as 24 and 25, positioned in close proximity to the conductor 18 so as to be within the operative portion 20 of the conductor's magnetic field. The direction of polarity of the magnets is preferably transverse to the path of travel of the vehicle and the direction of the groove 16. As used herein, the "direction of polarity" of a permanent magnet refers to the direction between the poles of the magnet itself or, if pole pieces are utilized which alter such direction, the direction between the poles of the pole pieces.

As shown in FIGS. 1 and 2, the permanent magnets 24, 25 are preferably embedded in the same groove 16 in which the electrical conductor 18 is embedded, positioned vertically above or below the conductor 18. In order that the permanent magnets do not shunt the operative portion 20 of the conductor's magnetic field away from the steering sensor 22, the magnets are composed of permanent magnet material having a magnetic permeability substantially equal to that of free space, i.e. substantially equal to one. Magnets having such low permeability include, for example, the various ferrite permanent magnets, rare earth cobalt magnets, and neodymium-iron-boron magnets. Alnico magnets are excluded because of their high permeability.

Moreover, it is preferable that the magnets 24, 25 be of a relatively high electrical resistivity (i.e. significantly higher than that of rare earth cobalt magnets in their normal sintered form) so that eddy currents and their resultant magnetic fields cannot be induced in the magnets in any significant magnitude by the alternating current in the conductor 18. Such eddy current fields could otherwise distort the operative portion 20 of the conductor's magnetic field. The ferrite magnets in their normal sintered form have the preferred high electrical resistivity. On the other hand, magnets such as rare earth cobalt, having normally low electrical resistivity, should preferably be in resin-bonded, powdered form to satisfy the high resistivity requirement.

Each permanent magnet has a magnetic field indicated generally as 26 (for magnet 24) in FIGS. 1 and 2. The magnetic fields of the individual magnets can be used to supply different types of information to magnetic field sensors on the vehicle 10. For example, if an array of permanent magnets are distributed along the groove 16 and have nonuniform polar orientations, such as indicated by the magnets 24 and 25 shown in FIG. 1, the vehicle 10 can receive a digitally-coded message from such magnets as it travels over them along the path of travel. The vehicle senses such a message by means of one or more polarity-sensing magnetic field sensors such as Hall effect sensors 28 and 30 (FIG. 2) having elongate flux collector pairs 28a, 28b and 30a, 30b, respectively, extending parallel to the direction of polarity of the magnets 24 and 25, and parallel to each other. It will be noted that the flux collectors 28a, 28b are connected to their Hall effect sensor 28 in a reverse relationship to the connection of flux collectors 30a and 30b to their Hall effect sensor 30. This represents one way to eliminate the effect of the earth's magnetic field on the sensing function of the sensors 28 and 30. For example, if the earth's magnetic field, represented as 32 in FIG. 1, is applied at any angle to the flux collectors, the component thereof sensed by sensor 30 will be opposite, but equal in magnitude, to that sensed by sensor 28. Conversely, the portion of the magnetic field 26 of the permanent magnet 24 sensed by sensor 30 will be opposite to, but of less flux density than, that sensed by sensor 28 because of the closer proximity of sensor 28 to the magnet 24. Alternative ways to eliminate the effect of the earth's magnetic field include using excitation currents of opposite polarities for two otherwise identically oriented sensor and flux collector assemblies, or orienting the two sensors oppositely with otherwise identical flux collector arrangements and excitation current polarities.

Figure 4:
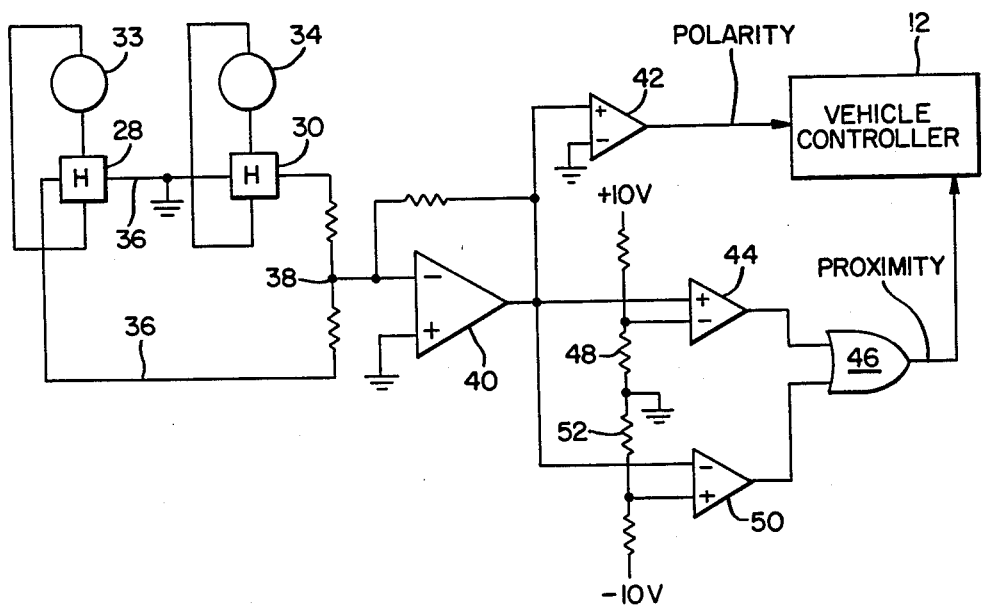
FIG. 4 is a simplified diagram of an exemplary output signal circuit of a pair of polarity-sensing magnetic field sensors employed in the present invention.

With reference to FIG. 4, the Hall effect sensors 28 and 30 are supplied with excitation current from constant current sources 33 and 34, respectively, while their output signals, which are proportional to sensed flux density but of opposite sign, are summed at junction 38. Thus, the equal and opposite components of the output signals of the sensors 28 and 30, resulting from the earth's magnetic field, cancel each other. Conversely, the unequal and opposite components of the output signals, resulting from the magnetic field 26 of the permanent magnet 24, are summed at junction 38 producing a resultant signal whose sign is dependent on the polarity of the magnet 24. The resultant signal is presented to the inverting input of an operational amplifier 40. The output of the amplifier 40 is thus positive or negative depending upon the polarity of the magnet 24, and is transmitted to the vehicle controller 12 which processes the output signal in a conventional manner to receive information indicative of approximate vehicle position, speed, the path ahead of the vehicle, or the like.

Moreover, if desired, the summed output signals from the polarity-sensing sensors 28 and 30 can be used as an approximate indicator of proximity to the magnet 24. Since the output signals of the Hall effect sensors 28 and 30 are each proportional to the sensed flux density of the magnetic field 26 of the permanent magnet 24, which, in turn, is dependent on the proximity of each sensor to the magnet, the output signal from amplifier 40 has a magnitude proportional to such proximity, regardless of its sign. Accordingly, a comparator 44 is provided to transmit a positive output signal to an OR gate 46 when amplifier 40 produces a positive output signal of a magnitude exceeding a threshold level set by resistor 48, while a comparator 50 similarly transmits a positive output signal to the OR gate 46 in response to a negative output signal from amplifier 40 of a similar magnitude exceeding a threshold level set by resistor 52. A positive output from either comparator 44 or comparator 50 causes OR gate 46 to deliver a positive output to the vehicle controller 12, approximately indicating a predetermined proximity to the permanent magnet along the vehicle's path of travel. This signal can be used for numerous purposes, such as decelerating the vehicle in preparation for stopping at the magnet, or preparing the vehicle's computer to accept the coded input of data from an array of permanent magnets.

The sensors 28 and 30, while providing a signal proportional to sensed flux density, are not well suited for accurate position sensing even though the sensed flux density is proportional to their proximity to the permanent magnet. The reasons why such sensors are inaccurate position indicators is that the flux density which they sense is a function not only of the proximity of the sensors to the magnet along the path of travel, but also of the proximity of the sensors transverse to the path of travel, which varies in response to steering control. Moreover, the sensors 28 and 30 will give identical outputs on either side of a permanent magnet along the path of travel, so that the direction of deviation or desired correction relative to the magnet will not be known.

Accordingly, a different pair of magnetic flux sensors, i.e. Hall effect sensors 54 and 56, are provided to indicate exact position of the vehicle relative to a permanent magnet such as 24 by producing a signal indicative of the deviation, or lack thereof, of the sensors with respect to the permanent magnet along the path of travel. It will be noted that the flux collectors 54a, 54b and 56a, 56b, respectively, extend longitudinally in a nonparallel relationship to the direction of polarity of the permanent magnet 24. Preferably they extend perpendicular to the direction of polarity of the magnet, i.e. parallel to the groove 16 for a transversely-magnetized magnet such as 24, and are parallel to each other. In the figures they are shown oppositely arranged relative to their respective sensors 54 and 56 such that the earth's magnetic field 32 causes equal but opposite output signals from the sensors 54 and 56, regardless of its angle of incidence relative to the sensors (but as before, opposite excitation current polarities or opposite sensor orientations could accomplish the same purpose). With respect to their sensing of the magnetic field 26 of the permanent magnet 24, the outputs of the two sensors are both zero when the sensors are aligned transversely along the path of travel with respect to the magnet 24. Alternatively, if the vehicle is angled with respect to the path of travel, their outputs are substantially equal and opposite when the sensor assembly is aligned transversely with the magnet 24 (i.e. when the two sensors are equidistant from the magnet in a direction along the path of travel) so that their sum provides a null signal. Thus, the sensors together provide an accurate, position-sensing null signal, indicating alignment with the magnet 24, which is relatively insensitive to transverse offsets or angles of the vehicle relative to the path of travel. When the sensor assembly is not so aligned with the magnet 24, the combined output of the sensors is of one sign or the other, such sign depending on the direction of deviation of the sensor assembly from the magnet along the path of travel.

Figure 3:
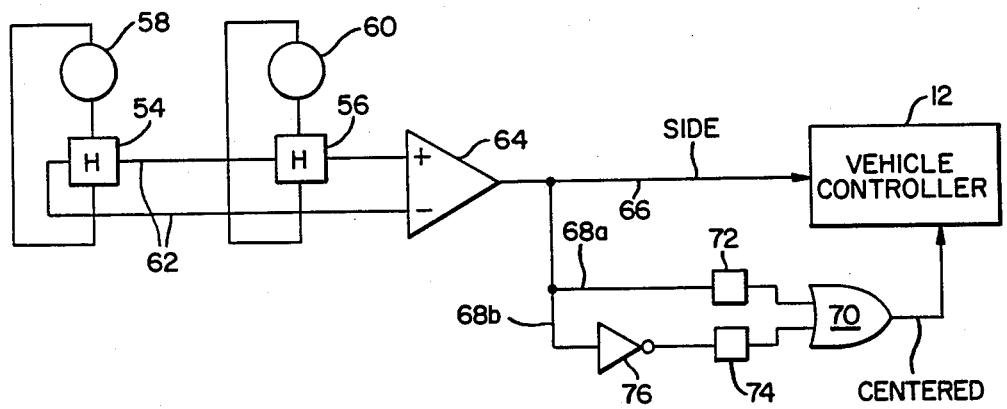
FIG. 3 is a simplified diagram of an exemplary output signal circuit of a pair of position-sensing magnetic field sensors employed in the present invention.

With respect to FIG. 3, the two sensors 54 and 56 are supplied with excitation current from constant current sources 58 and 60, while their outputs are connected in series by circuit 62 between the inverting and noninverting inputs of a comparator 64. As in the case of sensors 28 and 30, the equal but opposite components of the sensors' outputs resulting from the earth's magnetic field cancel each other. Moreover, when the sensors are aligned with the permanent magnet along the path of travel, they produce either zero output signals, or equal and opposite output signals (if the vehicle is angled relative to the path of travel), from their sensing of the magnetic field 26 of the permanent magnet. Accordingly, at alignment the output of comparator 64 is likewise zero. On the other hand, when the sensors 54 and 56 deviate to one side on the other of the magnet along the path of travel, their series-connected outputs, whether equal or unequal, are of one sign or the other depending on the direction of deviation. Accordingly, the output from the comparator 64 is likewise of one sign or the other depending on the direction of deviation.

Output signals of either sign from the comparator 64 are sensed by the vehicle controller 12 through line 66 and used to instruct the vehicle's drive system as to the direction of correction of the vehicle's position needed to bring the sensors into alignment with the magnet. Such signals could also be used to indicate proximity to the magnet, as a less preferable alternative to the proximity signals from sensors 28 and 30, for purposes of decelerating the vehicle preparatory to stopping in alignment with the magnet.

The zero output of comparator 64, indicating precise alignment of the sensors with the permanent magnet along the path of travel, is sensed through lines 68a and 68b respectively. Each of these lines is connected to an OR gate 70 through a respective positive edge triggered, one-shot multivibrator 72 or 74. When the output signal from comparator 64 crosses through zero toward positive polarity, indicating alignment with the permanent magnet, the one-shot multivibrator 72 transmits a positive output signal to the OR gate 70 causing the gate to deliver a positive output signal to the vehicle controller 12. Conversely, when the output signal from comparator 64 passes through zero toward negative polarity, likewise indicating alignment with the magnet, inverter 76 causes the other one-shot multivibrator 74 to transmit a positive output signal to the OR gate 70, which likewise causes the gate to deliver a positive output signal to the vehicle controller 12. The positive output signal from the gate 70 can be used by the vehicle controller 12 for any of several purposes, such as instructing the vehicle drive system to stop the vehicle in precise alignment with the magnet along the path of travel, or updating and correcting a fifth wheel encoder if the vehicle is so equipped.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In combination with a self-guided vehicle of the type which is guided along a predetermined path defined by an operative portion of a magnetic field of an elongate current-carrying conductor mounted separate from said vehicle, an apparatus for providing information to said vehicle comprising:
    (a) a permanent magnet;
    (b) magnetic sensor means on said vehicle for sensing the magnetic field of said permanent magnet;
    (c) said permanent magnet being positioned adjacent to said current-carrying conductor within said operative portion of the magnetic field of said conductor in a predetermined location along said conductor and having a magnetic permeability substantially no greater than that of free space so as to substantially prevent distortion by said magnet of said operative portion of the magnetic field of said conductor.

2. The apparatus of claim 1 wherein said permanent magnet has an electrical resistivity significantly greater than that of sintered rare earth cobalt magnets.

3. The apparatus of claim 1, including a supporting surface for said vehicle comprising magnetically impermeable material having an elongate depression formed therein and having both said conductor and said permanent magnet positioned within said depression.

4. The apparatus of claim 1 wherein said conductor and said permanent magnet are substantially in vertical alignment with each other.

5. The apparatus of claim 1 wherein said sensor means includes a pair of magnetic field sensor means for producing signals of opposing but equal magnitude in response to the earth's magnetic field.

6. The apparatus of claim 1 wherein said sensor means includes means for sensing the polar orientation of said permanent magnet.

7. The apparatus of claim 6 including a plurality of said permanent magnets proximately spaced with respect to each other along said conductor and having nonuniform polar orientations comprising code means for providing a predetermined code signal to said vehicle through said sensor means.

8. The apparatus of claim 1 wherein said permanent magnet is polarized in a direction substantially transverse to said conductor.

9. The apparatus of claim 1, including control means responsive to said sensor means for controlling said vehicle.

10. A method for providing information to a self-guided vehicle of the type which is guided along a predetermined path defined by an operative portion of a magnetic field of an elongate current-carrying conductor mounted separately from said vehicle, said method comprising:
    (a) positioning a permanent magnet adjacent to said current-carrying conductor within said operative portion of the magnetic field of said conductor in a predetermined location along said conductor;

(b) selecting said permanent magnet to have a magnetic permeability substantially no greater than that of free space; and (c) separately sensing said operative portion of the magnetic field of said conductor and the magnetic field of said permanent magnet, respectively, with magnetic field sensors mounted on said vehicle.

11. The method of claim 10, including selecting said permanent magnet to have an electrical resistivity significantly greater than that of sintered rare earth cobalt magnets.

12. The method of claim 10 including providing a magnetically impermeable supporting surface for said vehicle to move upon, forming an elongate depression in said supporting surface and positioning both said conductor and said permanent magnet within said depression.

13. The method of claim 10, including positioning said conductor and said permanent magnet substantially in vertical alignment with each other.

14. The method of claim 10, including sensing the magnetic field of said permanent magnet with a pair of said magnetic field sensors while causing said pair of sensors to produce signals of opposing but equal magnitude in response to the earth's magnetic field.

15. The method of claim 10, including sensing, with one of said magnetic field sensors, the polar orientation of said permanent magnet.

16. The method of claim 15, including positioning a plurality of said permanent magnets proximately to each other along said conductor and orienting the polarities of said magnets nonuniformly so as to provide a predetermined code signal, and sensing said code signal with one of said magnetic field sensors.

17. The method of claim 10, including orienting said permanent magnet with respect to said conductor so that the direction of polarity of said magnet is substantially transverse to said conductor.

18. In combination with a self-guided vehicle of the type which is guided along an elongate predetermined-path of travel, an apparatus for determining the location of said vehicle along said path comprising:

(a) a permanent magnet mounted separately from said vehicle in a predetermined location along said path; and (b) magnetic sensor means on said vehicle for sensing the magnetic field of said magnet and producing a signal representative of the direction of deviation or, alternatively, the lack of deviation, of said magnetic sensor means from said magnet longitudinally along said path.

19. The apparatus of claim 18 wherein said magnetic sensor means includes means for producing said signal substantially irrespective of any variations in the transverse alignment or angle of said vehicle with respect to said predetermined path of travel.

20. The apparatus of claim 18 wherein said magnetic sensor means includes a pair of magnetic field sensor means for producing signals of opposing but equal magnitude in response to the earth's magnetic field.

21. The apparatus of claim 18 wherein said magnetic sensor means includes a magnetic field sensor having elongate flux collectors extending longitudinally in nonparallel relationship to the direction of polarity of said permanent magnet.

22. The apparatus of claim 21 wherein said permanent magnet is polarized in a direction substantially transverse to said path of travel and said elongate flux collectors extend longitudinally substantially parallel to said path of travel.

23. The apparatus of claim 18, including vehicle control means responsive to said signal for causing said vehicle to stop at a predetermined position along said path with respect to said magnet in response to said signal.

24. The apparatus of claim 23, including a sensor on said vehicle for sensing the magnetic field of said magnet and producing a proximity signal representative of the proximity of said sensor to said magnet, and vehicle control means responsive to said proximity signal for causing said vehicle to decelerate in response to said proximity signal.

25. The apparatus of claim 18 wherein said predetermined path of travel is defined by an operative portion of a magnetic field of a current-carrying conductor and said magnet is positioned adjacent said conductor within said operative portion of the magnetic field thereof, said magnet having a magnetic permeability substantially no greater than that of free space.

26. The apparatus of claim 25, including a surface defining said path of travel comprising magnetically impermeable material having an elongate depression formed therein and having both said conductor and said permanent magnet positioned within said depression.

27. A method for determining the location of a self-guided vehicle along an elongate predetermined path of travel, said method comprising:

(a) mounting a permanent magnet separately from said vehicle in a predetermined location along said path;

(b) sensing the magnetic field of said magnet with a magnetic field sensor mounted on said vehicle; and (c) producing a signal from said magnetic field sensor representative of the direction of deviation or, alternatively, the lack of deviation, of said sensor from said magnet longitudinally along said path.

28. The method of claim 27, including producing said signal substantially irrespective of any variations in the transverse alignment or angle of said vehicle with respect to said predetermined path of travel.

29. The method of claim 27, including sensing the magnetic field of said magnet with a pair of magnetic field sensors while causing said pair of sensors to produce signals of opposing but equal magnitude in response to the earth's magnetic field.

30. The method of claim 27, including sensing the magnetic field of said magnet with a magnetic field sensor having elongate flux collectors, further including orienting said flux collectors to extend longitudinally in nonparallel relationship to the direction of polarity of said permanent magnet.

31. The method of claim 30, including orienting the direction of polarity of said magnet in substantially transverse relationship to said path of travel, further including orienting said elongate flux collectors so as to extend longitudinally substantially parallel to said path of travel.

32. The method of claim 27 including stopping said vehicle at a predetermined position along said path with respect to said magnet in response to said signal.

33. The method of claim 32, including sensing the magnetic field of said magnet with a proximity sensor on said vehicle, producing a proximity signal representative of the proximity of said proximity sensor to said magnet, and decelerating said vehicle in response to said proximity signal.

34. The method of claim 27 wherein said predetermined path of travel is defined by an operative portion of a magnetic field of an elongate current-carrying conductor mounted separately from said vehicle, further comprising selecting said permanent magnet to have a magnetic permeability substantially no greater than that of free space, and positioning said magnet adjacent to said current-carrying conductor within said operative portion of the magnetic field thereof in a predetermined location along said conductor.

35. The method of claim 34, including providing a magnetically-impermeable supporting surface for said vehicle to move upon, forming an elongate depression in said supporting surface and positioning both said conductor and said permanent magnet within said depression.

* * * * *

UNITED STATES PATENT AND TRADEMARK OFFICE
CERTIFICATE OF CORRECTION

PATENT NO. : 4,714,124

DATED : December 22, 1987

INVENTOR(S) : Donald L. Laib

It is certified that error appears in the above-identified patent and that said Letters Patent is hereby corrected as shown below:

Col. 4, line 40      Change "abovedescribed" to --above-described--

Col. 9, line 43      Change "predetermined-" to --predetermined--

Signed and Sealed this

Twenty-second Day of November, 1988

Attest:

DONALD J. QUIGG

*Attesting Officer*      *Commissioner of Patents and Trademarks*